United States Patent [19]

Merrill

[11] 3,843,770
[45] Oct. 22, 1974

[54] PREPARING CHLORINE PENTAFLUORIDE

[75] Inventor: Claude Merrill, Midland, Mich.

[73] Assignee: The Dow Company, Midland, Mich.

[22] Filed: Oct. 3, 1966

[21] Appl. No.: 584,016

[52] U.S. Cl. .............................................. 423/489
[51] Int. Cl............................................. C01b 7/24
[58] Field of Search...................... 23/205; 423/489

[56] References Cited
UNITED STATES PATENTS
3,097,067  7/1963  Fawcett et al. ...................... 23/205

OTHER PUBLICATIONS

D. F. Smith, Chlorine Pentafluoride, Science Vol. 141, Sept. 13, 1963, Pg. 1,039–1,040.

Rubenstein et al., Kinetics of the Thermal Reaction Between Tetraflurohydrazine and Fluorine Monoxide, Chemical Abstracts, Vol. 62, Pg. 9,845 e.f. 1965.

Holliday et al., Diboron Tetrafluoride, Reactions With Some Oxides and Organometallic Compounds, Chemical Abstracts, Vol. 61, Pg. 10,305 f, 1964.

*Primary Examiner*—Benjamin R. Padgett
*Assistant Examiner*—E. A. Miller
*Attorney, Agent, or Firm*—C. Kenneth Bjork

[57] ABSTRACT

The present application discloses a process for preparing chlorine pentafluoride wherein chlorine trifluoride is reacted with oxygen difluoride at temperatures ranging from 80° to 300°C. and at pressures of 1 atmosphere or greater.

2 Claims, No Drawings

PREPARING CHLORINE PENTAFLUORIDE

This invention relates to inorganic halogen compounds and more particularly is concerned with a novel process for preparing chlorine pentafluoride.

Chlorine pentafluoride ($ClF_5$) has been found to be a particularly effective oxidizer in certain rocket propellant systems.

Heretofore chlorine pentafluoride has been prepared using electric discharge techniques. This method has the disadvantage of high power requirements and in providing low product yields.

It also has been known to use cesium monochlorofluoride ($CsClF_4$) as a precursor in the preparation of $ClF_5$ but this is expensive because of the cost of cesium fluoride used to prepare the $CsClF_4$.

It is a principal object of the present invention to provide a novel process for preparing chlorine pentafluoride wherein the product is obtained in substantially quantitative yields.

This and other objects and advantages readily will become apparent from the detailed description presented hereinafter.

In accordance with the present process, chlorine trifluoride ($ClF_3$) and oxygen difluoride ($OF_2$) are reacted under a high pressure at a moderately elevated temperature.

More particularly, in the practice of the present novel process, chlorine trifluoride and oxygen difluoride at a molar proportion of $ClF_3/OF_2$ of from about 10/1 to 0.1/1, preferably at about stoichiometric, i.e., 1/1 molar proportions, are introduced into a pressurizable reactor inert to the reactants and reaction products. The reactor is sealed and the reaction mixture heated to a temperature of from about 80° C. to about 300° C. usually at from about 200° C. to about 250° C. under autogeneous pressure, usually at least about 1 atmosphere and ordinarily at from about 100 to about 700 atmospheres, and maintained under these temperature and pressure conditions for a period of from about 30 minutes to 6 hours or more, ordinarily from about 2 hours to about 4 hours. Following the reaction period, the reactor is cooled and the product mass recovered. Chlorine pentafluoride readily is recovered in high purity by codistillation or other separation and/or fractionation techniques.

Conveniently, the process is carried out in a sealed nickel or Monel metal reactor wherein the autogeneous pressure generated by the reaction mass at the indicated operating temperature is within the range set forth hereinbefore.

Nickel and Monel reactors or reactors having linings of these materials have been found to be particularly suitable for use in the present process as these are not detrimentally attacked by the reactants or reaction products and in turn do not detrimentally affect the reaction. However, the reactors and processing equipment can be fabricated from other materials which are substantially inert to the reactants and product materials and which have the requisite physical strength and desired structural characteristics as is understood by one skilled in the art.

For optimum yields and reactant conversion, the process, including product preparation and recovery, preferably is carried out in a substantially anhydrous atmosphere.

The following example will serve further to illustrate the present invention but is not meant to limit it thereto.

Oxygen difluoride at about 411 mm. Hg pressure and an equal quantity of chlorine trifluoride in a total volume of 1,237 milliliters were condensed at a temperature of about minus 196° C. into a nickel tube reactor of 4 milliliters volume. This provided $ClF_3/OF_2$ molar proportions of about 1/1. The reactor was sealed and heated at about 220° C. for about 6 hours. The autogeneous pressure generated, as calculated for ideal conditions, was about 550 atmospheres. Following this period, the reactor and contents were cooled and the products recovered by codistillation. Chlorine pentafluoride was obtained in high purity in substantially quantitative yield. Only a trace of oxygen difluoride was present in the product mass, this being the principal detectable impurity.

In a manner similar to that described for the foregoing example, chlorine trifluoride and oxygen difluoride at molar proportions of $ClF_3/OF_2$ from about 10/1 to 0.1/1 can be reacted within the temperature and pressure ranges disclosed herein to prepare chlorine pentafluoride in high yields.

Various modifications can be made in the present invention without departing from the spirit or scope thereof for it is understood that I limit myself only as defined in the appended claims.

I claim:

1. A process for preparing chlorine pentafluoride which comprises;
   a. providing a reaction mixture of chlorine trifluoride and oxygen difluoride, said mixture comprising $ClF_3/OF_2$ in molar proportions ranging from about 10/1 to 0.1/1,
   b. reacting said mixture at a temperature of from about 80° to about 300° C. at a pressure of at least about 1 atmosphere for a period of from about 30 minutes to about 6 hours, and
   c. recovering chlorine pentafluoride.

2. The process as defined in claim 1 wherein about 1/1 molar proportions of $ClF_3/OF_2$ are reacted under a pressure of from about 100 to about 700 atmospheres at a temperature of from about 200° C. to about 250° C. for a period of from about 2 to about 4 hours.

* * * * *

UNITED STATES PATENT OFFICE
CERTIFICATE OF CORRECTION

Patent No. 3,843,770          Dated October 22, 1974

Inventor(s) Claude Merrill

It is certified that error appears in the above-identified patent and that said Letters Patent are hereby corrected as shown below:

Correct Assignee to read: "The Dow Chemical Company"

in place of The Dow Company.

Signed and sealed this 4th day of February 1975.

(SEAL)
Attest:

McCOY M. GIBSON JR.
Attesting Officer

C. MARSHALL DANN
Commissioner of Patents